(12) United States Patent
Dubois et al.

(10) Patent No.: US 8,220,335 B2
(45) Date of Patent: Jul. 17, 2012

(54) ACCURATE IMAGE ACQUISITION FOR STRUCTURED-LIGHT SYSTEM FOR OPTICAL SHAPE AND POSITIONAL MEASUREMENTS

(75) Inventors: Marc Dubois, Fort Worth, TX (US); Thomas E. Drake, Jr., Fort Worth, TX (US); Mark A. Osterkamp, Weatherford, TX (US); David L. Kaiser, Fort Worth, TX (US); Tho X. Do, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1097 days.

(21) Appl. No.: 12/122,034

(22) Filed: May 16, 2008
(Under 37 CFR 1.47)

(65) Prior Publication Data
US 2009/0284593 A1 Nov. 19, 2009

(51) Int. Cl.
*G01N 29/04* (2006.01)
*G01S 5/02* (2010.01)
(52) U.S. Cl. .............. 73/618; 345/419; 348/135
(58) Field of Classification Search .......... 345/419; 73/621, 601, 643, 618; 348/135
See application file for complete search history.

(56) References Cited

U.S. PATENT DOCUMENTS

| 2002/0048015 A1 | 4/2002 | Drake et al. | |
| 2004/0154402 A1* | 8/2004 | Drake, Jr. | 73/621 |
| 2006/0017720 A1* | 1/2006 | Li | 345/419 |
| 2006/0017937 A1 | 1/2006 | Vaccaro et al. | |
| 2006/0219014 A1* | 10/2006 | Turner et al. | 73/643 |
| 2007/0150228 A1* | 6/2007 | Fukumoto et al. | 702/155 |
| 2007/0271053 A1 | 11/2007 | Palmateer | |

FOREIGN PATENT DOCUMENTS

| WO | 0177613 A1 | 10/2001 |
| WO | 0218958 | 3/2002 |
| WO | 2006109308 A1 | 10/2006 |
| WO | 2007125081 A1 | 11/2007 |
| WO | 2008052348 A1 | 5/2008 |

OTHER PUBLICATIONS

International Search Report and Written Opinion for PCT/US2009/043902, dated Sep. 25, 2009, 4 pages.
International Search Report and Written Opinion for PCT/US2009/043886, dated Aug. 5, 2009, 5 pages.
International Search Report and Written Opinion for PCT/US2009/043897, dated Aug. 6, 2009, 10 pages.
Quotation No. 1141, Lasson Technologies, Inc., Creating Innovative Solutions for Inspection and Process Control, Nov. 3, 2003, pp. 1-3.
Turner et al., Using Computer Vision to Map Laser Ultrasound Onto CAD Geometries, CP657, Review of Quantitative Nondestructive Evaluation, vol. 22, copyright 2003 American Institute of Physics, pp. 340-347.

* cited by examiner

*Primary Examiner* — Frantz Jean
(74) *Attorney, Agent, or Firm* — Bracewell & Giuliani LLP

(57) ABSTRACT

A system and method for the analysis of composite materials. Improved techniques for the measurement of the shape and position of the composite article are provided, which include improved scanning rates using structured light.

13 Claims, 1 Drawing Sheet

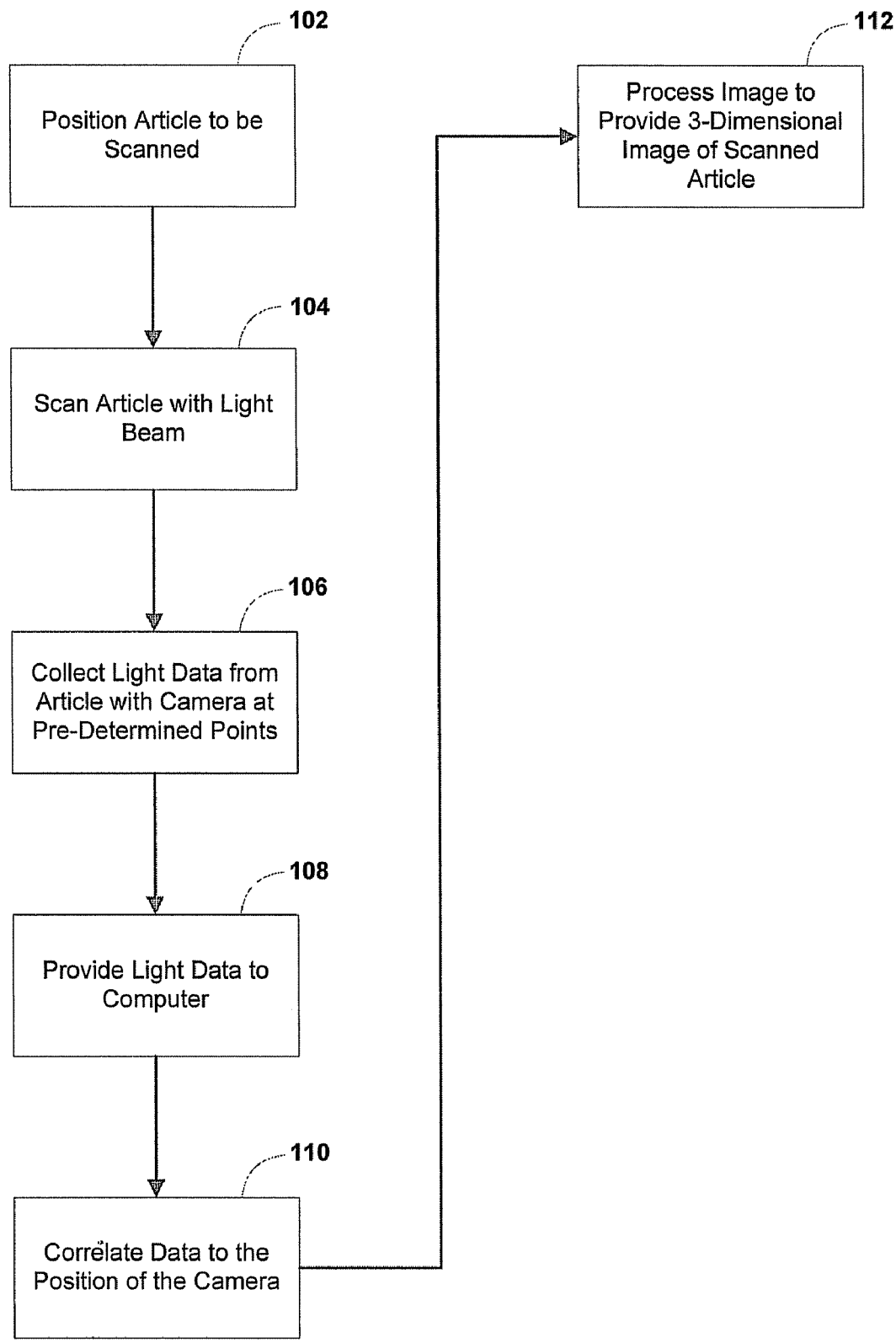

ACCURATE IMAGE ACQUISITION FOR STRUCTURED-LIGHT SYSTEM FOR OPTICAL SHAPE AND POSITIONAL MEASUREMENTS

BACKGROUND OF THE INVENTION

1. Technical Field of the Invention

This invention generally relates to the field of non-destructive techniques for measurement of composite materials. More specifically, the invention relates to improved techniques for the measurement of 3-dimensional composite articles.

2. Description of the Prior Art

In recent years, use of composite materials has grown in the aerospace and other commercial industries. Composite materials offer significant improvements in performance, however they are difficult to manufacture and thus require strict quality control procedures during manufacturing. In addition, composite materials lend themselves well to the manufacture of parts having irregular shapes. Non-destructive evaluation ("NDE") techniques have been developed as a method for the identification of defects in composite structures, such as, for example, the detection of inclusions, delaminations and porosities. Conventional NDE methods are typically slow, labor-intensive and costly. As a result, the testing procedures adversely increase the manufacturing costs associated with composite structures.

For parts having irregular surfaces, the measurement data is preferably correlated to positional 3-dimensional data. For these parts, determination of the shape of the part is key to correlating the measurement to a position on the part. Prior art methods for scanning composite parts having irregular shapes required that the part being scanned be positioned on a table and secured in a known position, thereby providing a starting reference point for the scan. For large and/or irregularly shaped objects, the table or other means required to position a part are expensive and frequently specific for only one part.

According to the prior art methods, scanning of complex shaped parts to determine the 3-dimensional shape of the part required multiple scans from several different poses or views. These scans are frequently slow in determining the 3-dimensional shape an object. Thus, there exists a need for a method and apparatus for the rapid acquisition of 3-dimensional position data.

SUMMARY OF THE INVENTION

A non-contact method and apparatus for determining the 3-dimensional shape of an object is provided.

In one aspect of the invention, a method of analyzing an article and providing the 3-dimensional structure are described. The method includes the steps of: (a) positioning an article for evaluation; (b) scanning the article with a beam of light; (c) detecting the beam of light on the article with a camera; (d) executing a first computer implemented process to capture and process the light detected from the article by the camera; and (e) executing a second computer implemented process to obtain 3-dimensional data relating to the shape of the article, wherein the scanning of the article and the detection of the beam of light occur simultaneously while the article is being scanned.

In certain embodiments, the light has a known wavelength and pattern. In certain embodiments, the camera includes a CCD image sensor. In certain embodiments, scanning the article includes operating a pan-and-tilt unit, wherein the pan-and-tilt unit includes the light beam source and the light detecting camera. In certain embodiments, a third computer implemented process instructs the camera to detect the beam of light on the article at preselected locations, wherein the third computer implemented process controls the pan-and-tilt unit. In certain embodiments, a third computer implemented process records the position of the pan-and-tilt unit and correlates the position of the pan-and-tilt unit to the 3-dimensional data relating to the shape of the article. In certain embodiments, the method further includes calibrating the light source and camera prior to scanning the article with the beam of light. In another aspect, an apparatus for measuring a three-dimensional representation of an object is provided. The apparatus includes a light beam source; a light detection camera; means for controlling movement of the light beam source and the light detection camera; a central processing unit; and a motion control system; wherein the light beam source and the light detection means are coupled to each other.

In certain embodiments, the apparatus further includes an articulated robotic arm that includes the light beam source, light detection means and means for controlling movement of the light beam source and light detection camera. In certain embodiments, the means for controlling movement of the light beam source and the light detection camera includes a pan-and-tilt unit. In certain embodiments, the apparatus further includes a central processing unit and user interface, wherein the central processing unit is operable to control the means for controlling movement of the light beam source and light detection camera. In certain embodiments, the central processing unit is configured to record information from the light detection means. In certain embodiments, the central processing unit is configured to process the information recorded by the light detection means. In certain embodiments, the central processing unit is configured to produce a three-dimensional representation of the object using the information obtained by the camera.

BRIEF DESCRIPTION OF THE DRAWINGS

FIG. 1 provides a logic flow diagram in accordance with one embodiment of the present invention.

DETAILED DESCRIPTION OF THE INVENTION

The present invention includes multiple embodiments in different forms. Specific embodiments are described in detail and are shown in the figures, with the understanding that the present disclosure is to be considered an exemplification of the principles of the invention, and is not intended to limit the invention to those embodiments illustrated and described herein. It is to be fully recognized that the various teachings of the embodiments discussed herein may be employed separately, or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Described herein are a non-contact method and apparatus for determining the shape and 3-dimensional coordinates of an article. After the 3-dimensional measurements of the article have been determined, the part can be scanned and physical and spectroscopic data can be correlated to specific locations on the article.

Structured light is one exemplary non-contact technique for the mapping of 3D composite materials, which involves the projection of a light pattern (for example, a plane, grid, or other more complex shape), at a known angle onto an object. This technique is useful for imaging and acquiring dimensional information of various shaped objects. Typically, the light pattern is generated by fanning out or scattering a light beam into a sheet of light. One exemplary light source is a laser. When the sheet of light intersects with an object, a bright light can be seen on the surface of the object. By observing the line of light from an angle, typically at a detection angle which is different than the angle of the incident light, distortions in the line can be translated into height variations on the object being viewed. Multiple scans of views (frequently referred to as poses) can be combined to provide the shape of the entire object. Scanning an object with light can provide 3-D information about the shape of the object. This is sometimes referred to as active triangulation.

Because structured light can be used to determine the shape of an object, it can also help to both recognize and locate an object in an environment. These features make structured light a useful technique for use in assembly lines that implement process control or quality control. Objects can be scanned to provide a shape of an article, which can then be compared against archived data. This advantage can allow for further automation of assembly lines, thereby generally decreasing the overall cost.

The beam of light projected onto the object can be observed with a light detection means, such as a camera or the like. Exemplary light detecting means include a CCD camera, or the like. A variety of different light sources can be used as the scanning source, although a laser is preferable because of its precision and reliability.

Structured light beam sources project a pattern of light on the object being scanned and look at the deformation of the pattern on the subject which corresponds to changes in the surface of the object. The pattern may be one dimensional or two dimensional. An example of a one dimensional pattern is a line. The line is projected onto the subject using either an LCD projector or a sweeping laser. The detection means, such as a camera, looks at the shape of the line and uses a technique similar to triangulation to calculate the distance of every point on the line. In the case of a single-line pattern, the line is swept across the field of view to gather distance information one strip at a time.

One advantage of a structured light 3D scanner is scanning speed. Instead of scanning one point at a time, certain structured light scanners are capable of scanning multiple points or the entire field of view at once. This reduces or eliminates the problem of distortion from the scanning motion. Some existing systems are capable of scanning moving objects in real-time.

In certain embodiments, the structured light system detection camera includes a filter designed to pass light corresponding only to a specified wavelength, such as the wavelength of the scanning laser. The detection camera is operable to detect and record the light image, and using various algorithms, determine the coordinate values corresponding to the image. In certain embodiments, the laser and the detection camera view the object from different angles.

In certain embodiments, the structured light system can also include a second camera, known as a texture camera, which is operable to provide a full image of the object.

In a preferred embodiment, the optimum manner of scanner a part is determined, including optimizing (i.e., minimizing) the number of views or "poses" required for each complete scan, thereby effectively minimizing overlap of the scans, and also minimizing the need to reconstruct subsequent scans or to take additional scans. In certain embodiments, the number of poses can be optimized according to measured data. In certain other embodiments, the number of poses can be optimized in view of pre-existing CAD data. In yet other embodiments, CAD data can be analyzed prior to scanning the object to program and minimize the number of scans necessary for a given article or part to be scanned.

In certain embodiments, the structured light system provides a series of data points to generate a point cloud corresponding to the shape of the object and the specific view of the part being scanned. The point clouds for each view or pose can then be merged to assemble a composite point cloud of the entire part. The individual point cloud data can then be transformed into specific cell coordinate systems.

Once all of the measured poses for each part have been assembled to provide a composite point cloud for the entire part, and the relative coordinates for the part have been determined, the data set corresponding to the part can then be registered. Registering the data set corresponding to the part provides a fall complement of coordinate points for the part, and allows the data to be manipulated in space, thereby allowing the same part to be readily identified in later scans. Once a part has been registered, like parts are more easily identified and confirmed by comparing a subsequent scan against prior scans or confirmed CAD data. The registered scans can be collected to provide a database.

In one aspect, the present invention provides an automated non-destructive technique and apparatus for acquiring 3-dimensional positional data of articles. An exemplary embodiment of the structured light apparatus includes at least one light source and at least one optical means for detection of the light. In certain embodiments, the optics means can include an optical scanner, a camera, a CCD array, or the like.

In a preferred embodiment, the structured light system can include a laser for providing the structured light signal, an optional texture camera for providing panoramic images of the object being scanned, and a structured light camera having a CCD array. In certain embodiments, the structured light camera can include a filter designed to filter light of any wavelength other than the wavelength of the light generated by the laser.

In certain embodiments, the system can be coupled to an articulated robotic arm having a rotational axis about the arm. In certain embodiments, the system can include a pan-and-tilt unit coupling the structured light system to the robotic arm. The pan-and-tilt unit enables the part to be scanned while the robotic arm remains stationary. The robotic arm preferably includes sensors allowing the system to be aware of the position of the arm and the attached camera and light source, thereby providing a self-aware absolute positioning system and eliminating the need to position the part being scanned on a referenced tool table. Additionally, the self-aware robotic system is suitable for scanning large objects that may be too large for analysis on a tool table. The system may be coupled to a computer that includes software operable to control the various cameras and to collect the data. In certain embodiments, the system may be a stationary system. In certain other embodiments, the system can be coupled to a linear rail. In certain other embodiments, the system can be mounted to a movable base or to a vehicle. The vehicle can be advantageously used to transport the system to a variety of locations as well as for the evaluation of large objects, such as an aircraft.

In certain embodiments, the means for moving the structured light system, including an articulated robotic arm or other means for moving the arm, can also include means for preventing collision with objects in the general area, such as for example, tables or the like. Collision avoidance can be achieved by a variety of means, including programming the location of all fixed items and objects into a control system for the robotic arm or through the use various sensors placed on the objects in the general area where the article or part is being examined. Preferably, the means for moving the structured light apparatus is prohibited out from occupying the space that is occupied by the part being scanned.

Referring now to FIG. 1, the steps for an exemplary method for scanning a part to obtain to positional data are provided. In a first step 102, a part is positioned in a predefined location for scanning with a structured light system. The system includes a calibrated structured light system, and robotic positioning system. Generally, it is not necessary for the part to be positioned in a known location, as was necessary in the prior art, although it is advantageous for the part to be positioned in a defined location. In a second step 104, a part is scanned with a structured light system. In certain embodiments, the structured light system follows a predetermined path to measure the absolute position of the part surface, relative to the structured light system. Typically, the structured light camera includes a filter that and only measures the laser light. This can be accomplished by filtering out all wavelengths other than the wavelength produced by the laser. The system is moved and repositioned to take the remaining images of the part to ensure the entire surface of the part being scanned. In step 106, the camera collects signals generated by scanning the article with the laser light. The camera is configured to take light measurements at predetermined locations while the part is being scanned. In step 108, the light data captured by the camera is provided to a computer for further processing. A line detection algorithm determines the coordinates for each individual scan over the object surface. Additionally, the computer is provided data relating to the position of the light source and the light detector. In step 110, the computer correlates the light data obtained with the camera and the positional data relating to the location of the light source and the camera. In a sixth step 112, after the entire surface of the part has been scanned, the data is processed to provide a 3-dimensional image of the scanned article. In certain embodiments, the 3-dimensional image can be correlated to an image obtained with a texture camera.

In certain embodiments, CAD data may be available for the object being analyzed. In these embodiments, the 3D positional data generated by the structured light system can be compared against and/or overlayed with the CAD data. This can be used as a quality control procedure to verify the manufacturing process. In other embodiments, the structured light data can be overlayed with the CAD data to provide confirmation of the part. Data that is collected with the structured light system can be used to provide a data cloud corresponding to the 3D structure of the object. Based upon calibration techniques used for the system, an absolute data cloud can be produced. The data cloud can then be oriented onto the CAD drawing, thereby providing correlation between the structured light data and the CAD data.

In certain embodiments, the apparatus can include a second camera, known as a texture camera. The texture camera generally captures images of the object, and can be used for part recognition purposes. Unlike the structured light camera, the texture camera image is not filtered to remove the object from the image. While the structured light data provides a virtual surface of the part, the texture camera can provide an actual image of the object, which can be used in conjunction with the structured light. In this manner, both the structured light data and the CAD data can be compared with the visual image provided by the texture camera. Additionally, the texture camera can provide a view of the part being scanned to the operator or for archival purposes.

Preferably, the structured light system is calibrated prior to performing the scan of the object. Calibration is necessary to ensure accuracy in the measurement and preparation of the coordinate data relating to the object being scanned. In certain embodiments, the system is calibrated locally, i.e., in relation to the tilt and pivot mechanism, by scanning a object having a known shape with the structured light system, collecting the data and comparing/calibrating the structured light measurements.

As understood by one of skill in the art, scanning of parts having complex shapes may require multiple scans. In one embodiment, the scans are conducted such that scans overlap at seams or edges of the part. In another embodiment, the scans are performed Registration and comparison of the structured light data, against either CAD data or prior scans of similar or the same part, can help to ensure that 100% of the surface area is scanned with minimal overlap, or with overlap in the critical areas of the part. Additionally, registration allows for features and/or defects to be scanned and compared across multiple parts. This allows problem areas to be analyzed and solutions to be developed for the prevention of future defects. Additionally, storage of the data allows for parts being repaired to be compared with the "as constructed" data set.

For smaller parts having a complex shape, a tooling table can be used which includes pegs and posts to provide the necessary alignment cues for the structured light system. However, use of the tooling table as a base and support for the part being examined requires prior knowledge of the shape of the part, as well as a beginning reference point for the part.

As used herein, the terms about and approximately should be interpreted to include any values which are within 5% of the recited value. Furthermore, recitation of the term about and approximately with respect to a range of values should be interpreted to include both the upper and lower end of the recited range.

While the invention has been shown or described in only some of its embodiments, it should be apparent to those skilled in the art that it is not so limited, but is susceptible to various changes without departing from the scope of the invention.

We claim:

1. A method of analyzing an article the steps of:
  positioning an article for evaluation;
  scanning the article with a beam of light, the beam of light having a known wavelength and pattern;
  detecting the beam of light on the article with a camera comprising a CCD image sensor;
  executing a first computer implemented process to process the light detected from the article by the camera; and
  executing a second computer implemented process to obtain 3-dimensional data relating to the shape of the article;
  wherein the steps of scanning of the article and detecting the beam of light occur simultaneously while the article is being scanned.

2. The method of claim 1 wherein the step of scanning the article comprising operating a pan-and-tilt unit, said pan-and-tilt unit comprising the light beam source and the light detecting camera.

3. The method of claim 2 wherein a third computer implemented process instructs the camera to detect the beam of light on the article at preselected locations, said third computer implemented process controls the pan-and-tilt unit.

4. The method of claim 3 wherein a third computer implemented process records the position of the pan-and-tilt unit and correlates the position of the pan-and-tilt unit to the 3-dimensional data relating to the shape of the article.

5. The method of claim 1 further comprising calibrating the light source and camera prior to scanning the article with the beam of light.

6. An apparatus for a three-dimensional representation of an object, comprising:
- a light beam source, wherein the light beam source is operable to project an optical pattern of known shape and known wavelength onto the object;
- a light detection camera;
- means for controlling movement of the light beam source and the light detection camera, wherein the means for controlling movement of the light beam source and the light detection camera includes a pan-and-tilt unit;
- a central processing unit; and
- a motion control system;
- wherein the light beam source and the light detection camera are coupled to each other.

7. The apparatus of claim 6 further comprising an articulated robotic arm comprising the light beam source, light detection camera and means for controlling movement of the light beam source and light detection camera.

8. The apparatus of claim 6 wherein the light detection camera has a field of view encompassing at least a portion of a reflected pattern from said object, wherein said light detection means is operable to capture said reflections.

9. The apparatus of claim 6 wherein the central processing unit further comprises a user interface, wherein the central processing unit is operable to control the means for controlling movement of the light beam source and light detection camera.

10. The apparatus of claim 9 wherein the central processing unit is configured to record information from the light detection camera.

11. The apparatus of claim 6 wherein the central processing unit is configured to process the information recorded by the light detection camera.

12. The apparatus of claim 6 wherein the interception of the light beam by the object generates structured light surface information for the object.

13. The apparatus of claim 6 wherein the central processing unit is configured to produce a three-dimensional representation of the object using the information obtained by the light detection camera.

* * * * *